(12) United States Patent
Groninga et al.

(10) Patent No.: US 10,836,481 B2
(45) Date of Patent: Nov. 17, 2020

(54) BIPLANE TILTROTOR AIRCRAFT

(71) Applicant: Bell Helicopter Textron Inc., Fort Worth, TX (US)

(72) Inventors: Kirk L. Groninga, Keller, TX (US); Frank B. Stamps, Colleyville, TX (US); Daniel B. Robertson, Southlake, TX (US); Matthew E. Louis, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 363 days.

(21) Appl. No.: 15/808,801

(22) Filed: Nov. 9, 2017

(65) Prior Publication Data

US 2019/0135423 A1  May 9, 2019

(51) Int. Cl.
| | |
|---|---|
| *B64C 29/00* | (2006.01) |
| *B64C 3/38* | (2006.01) |
| *B64C 9/14* | (2006.01) |
| *B64C 39/08* | (2006.01) |
| *B64C 15/12* | (2006.01) |
| *B64C 27/28* | (2006.01) |

(52) U.S. Cl.
CPC ............ *B64C 29/0033* (2013.01); *B64C 3/38* (2013.01); *B64C 9/14* (2013.01); *B64C 15/12* (2013.01); *B64C 27/28* (2013.01); *B64C 39/08* (2013.01)

(58) Field of Classification Search
CPC ..... B64C 15/12; B64C 27/28; B64C 29/0033; B64C 39/08; B64C 3/38; B64C 9/14; B64C 2201/024; B64C 2201/088; B64C 2201/108
See application file for complete search history.

(56) References Cited

U.S. PATENT DOCUMENTS

| 1,246,016 | A | * | 11/1917 | Curtiss | .................... | B64C 35/00 |
| | | | | | | 244/106 |
| 1,264,037 | A | | 4/1918 | Emmons | | |
| 1,285,230 | A | * | 11/1918 | Kleckler et al. | ........ | B64C 35/00 |
| | | | | | | 244/105 |
| 1,287,249 | A | * | 12/1918 | Curtiss | .................... | B64C 3/385 |
| | | | | | | 244/48 |
| 1,312,910 | A | * | 8/1919 | Janin | ....................... | B64C 35/00 |
| | | | | | | 244/106 |
| 1,394,630 | A | * | 10/1921 | Loening | ................ | B64C 35/001 |
| | | | | | | 244/54 |

(Continued)

FOREIGN PATENT DOCUMENTS

| EP | 3141478 A1 | 3/2017 |
| GB | 400735 A | 11/1933 |
| WO | 2005066020 A1 | 7/2005 |

OTHER PUBLICATIONS

EPO Examination Report for EP Application No. 18202178.2 dated Feb. 25, 2019, 5 pages.

(Continued)

*Primary Examiner* — Medhat Badawi
(74) *Attorney, Agent, or Firm* — Patent Capital Group

(57) ABSTRACT

In one embodiment, a tiltrotor aircraft may comprise a fuselage; a biplane wing coupled to the fuselage, wherein the biplane wing comprises an upper wing structure and a lower wing structure; a plurality of tiltrotors coupled to the biplane wing; and at least one engine to power the plurality of tiltrotors.

18 Claims, 6 Drawing Sheets

(56) References Cited

U.S. PATENT DOCUMENTS

| | | | | |
|---|---|---|---|---|
| 1,436,552 A * | 11/1922 | Ventress, Sr. | B64C 29/0033 | 244/56 |
| 1,498,412 A * | 6/1924 | Whiteside | B64C 23/005 | 244/7 R |
| 1,696,493 A * | 12/1928 | Lenert | B64C 3/00 | 244/45 R |
| 1,704,076 A * | 3/1929 | Carroll | B64C 35/00 | 244/101 |
| 1,747,565 A * | 2/1930 | Yonkese | B64C 13/00 | 244/87 |
| 1,890,035 A * | 12/1932 | Hall | B64C 39/00 | 244/45 R |
| 2,084,502 A * | 6/1937 | Rieder | B64C 39/00 | 244/45 R |
| 2,147,795 A * | 2/1939 | Martin | B64C 35/001 | 244/106 |
| 2,899,823 A * | 8/1959 | Parsons | G01P 13/025 | 73/181 |
| 2,910,254 A * | 10/1959 | Razak | B64C 39/08 | 244/208 |
| 3,181,810 A * | 5/1965 | Olson | B64C 29/0033 | 244/7 R |
| 3,202,383 A * | 8/1965 | Le Bel | B64C 23/005 | 244/209 |
| 3,404,852 A * | 10/1968 | Sambell | B64C 29/0033 | 244/7 A |
| 3,834,654 A * | 9/1974 | Miranda | B64C 39/068 | 244/13 |
| 3,954,231 A * | 5/1976 | Fraser | B64C 3/16 | 244/225 |
| 3,981,460 A * | 9/1976 | Ratony | B64C 39/068 | 244/13 |
| 4,053,125 A * | 10/1977 | Ratony | B64C 39/068 | 244/46 |
| 4,090,681 A * | 5/1978 | Zimmer | B64C 39/068 | 244/45 R |
| 4,146,199 A * | 3/1979 | Wenzel | B64C 39/068 | 244/36 |
| 4,365,773 A * | 12/1982 | Wolkovitch | B64C 39/068 | 244/123.7 |
| 4,387,866 A * | 6/1983 | Eickmann | H01F 41/08 | 244/123.9 |
| 4,484,721 A * | 11/1984 | Gue | B64C 35/00 | 114/274 |
| D286,871 S * | 11/1986 | Bunyard | D12/324 | |
| 4,685,643 A * | 8/1987 | Henderson | B64C 7/02 | 244/199.1 |
| 4,739,957 A * | 4/1988 | Vess | B64C 9/34 | 244/199.1 |
| D304,821 S * | 11/1989 | Ratony | D12/331 | |
| D308,043 S * | 5/1990 | Butler | D12/331 | |
| D311,720 S * | 10/1990 | Butler | D12/331 | |
| 4,982,914 A * | 1/1991 | Eickmann | B64C 11/28 | 244/54 |
| 5,046,684 A * | 9/1991 | Wolkovitch | B64C 29/0033 | 244/45 R |
| 5,419,514 A * | 5/1995 | Ducan | B64C 29/0033 | 244/12.4 |
| 5,503,352 A * | 4/1996 | Eger | B64C 39/068 | 244/13 |
| 5,899,409 A * | 5/1999 | Frediani | B64C 39/068 | 244/13 |
| 5,899,410 A * | 5/1999 | Garrett | B64C 39/068 | 244/45 R |
| 6,086,014 A * | 7/2000 | Bragg, Jr. | B64C 37/00 | 244/2 |
| 6,098,923 A * | 8/2000 | Peters, Jr. | B64C 3/16 | 244/13 |
| 6,161,800 A * | 12/2000 | Liu | B64C 9/32 | 244/17.19 |
| 6,340,134 B1 * | 1/2002 | Meschino | B64C 1/26 | 244/130 |
| 6,626,398 B1 * | 9/2003 | Cox | B64C 39/024 | 244/45 R |
| 6,659,394 B1 * | 12/2003 | Shenk | B64C 3/385 | 244/7 C |
| 6,840,478 B2 * | 1/2005 | Carr | B64C 3/46 | 244/45 R |
| 7,216,830 B2 * | 5/2007 | Quayle | B64C 1/0009 | 244/1 N |
| 7,581,699 B1 * | 9/2009 | Tafoya | B64C 1/0009 | 244/119 |
| 7,802,754 B2 * | 9/2010 | Karem | B64C 29/0033 | 244/12.4 |
| 8,066,219 B2 * | 11/2011 | Patt | B64C 29/0033 | 244/12.4 |
| 8,152,096 B2 * | 4/2012 | Smith | B64C 29/0033 | 244/12.4 |
| 8,439,310 B2 * | 5/2013 | Cazals | B64C 39/068 | 244/135 R |
| 8,657,226 B1 * | 2/2014 | McGinnis | B64C 3/16 | 244/45 R |
| 9,586,683 B1 * | 3/2017 | Buchmueller | B64C 39/024 | |
| 9,623,967 B2 * | 4/2017 | Mallard | B64C 29/0033 | |
| 9,694,908 B2 * | 7/2017 | Razroev | B64C 29/0033 | |
| D817,812 S * | 5/2018 | Whitten, Jr. | D12/16.1 | |
| 10,131,424 B2 * | 11/2018 | Fink | B64C 25/10 | |
| 10,301,016 B1 * | 5/2019 | Bondarev | B64C 9/12 | |
| 10,377,482 B2 * | 8/2019 | Gibboney | B64C 39/08 | |
| 10,399,673 B1 * | 9/2019 | Roop | B64C 25/56 | |
| 10,435,146 B2 * | 10/2019 | Welsh | B62D 63/04 | |
| 2003/0136873 A1 * | 7/2003 | Churchman | B64C 29/0025 | 244/10 |
| 2004/0056150 A1 * | 3/2004 | Morgenstern | B64C 30/00 | 244/45 R |
| 2005/0230519 A1 * | 10/2005 | Hurley | B64C 29/0033 | 244/7 C |
| 2006/0108476 A1 * | 5/2006 | Padan | B64D 37/12 | 244/135 R |
| 2006/0144991 A1 * | 7/2006 | Frediani | B64C 39/068 | 244/45 R |
| 2006/0239824 A1 * | 10/2006 | Robertson | B64C 11/16 | 416/231 B |
| 2007/0158494 A1 * | 7/2007 | Burrage | B64C 29/0033 | 244/7 R |
| 2009/0127861 A1 * | 5/2009 | Sankrithi | F03B 13/264 | 290/54 |
| 2009/0261207 A1 * | 10/2009 | Teacherson | B64C 39/066 | 244/45 R |
| 2010/0072325 A1 * | 3/2010 | Sambell | B64C 11/28 | 244/7 A |
| 2011/0001020 A1 * | 1/2011 | Forgac | B64C 29/0033 | 244/7 A |
| 2011/0036939 A1 * | 2/2011 | Easter | B60F 5/02 | 244/2 |
| 2011/0180660 A1 * | 7/2011 | Llamas Sandin | B64C 39/068 | 244/1 N |
| 2012/0234968 A1 * | 9/2012 | Smith | B64C 29/0033 | 244/12.3 |
| 2013/0175404 A1 * | 7/2013 | Shefer | B64C 39/00 | 244/7 A |
| 2014/0061376 A1 * | 3/2014 | Fisher | B64D 27/24 | 244/62 |
| 2014/0064922 A1 * | 3/2014 | Smith | F16F 13/08 | 415/118 |
| 2015/0048215 A1 * | 2/2015 | McGinnis | B64C 9/00 | 244/90 R |
| 2015/0251755 A1 * | 9/2015 | Schaefer | B64C 39/022 | 290/55 |
| 2015/0336655 A1 * | 11/2015 | Chandler | B64C 5/06 | 244/45 A |
| 2018/0044011 A1 * | 2/2018 | Reichert | B64C 11/28 | |
| 2018/0093777 A1 * | 4/2018 | Cheung | B64C 21/06 | |

OTHER PUBLICATIONS

EPO Search Report for EP Application No. 18202178.2 dated Feb. 11, 2019, 5 pages.

(56) References Cited

OTHER PUBLICATIONS

Fuller, S.L., "Airbus Helicopters Aims to Fly High-Speed Demonstrator in 2020," Roger & Wing International, Jun. 21, 2017 (5 pages).
EPO Examination Report for EP Application No. 18202178.2 dated Sep. 12, 2019, 4 pages.
EPO Examination Report for EP Application No. 18202178.2 dated Mar. 16, 2020, 4 pages.

* cited by examiner

BIPLANE TILTROTOR AIRCRAFT

TECHNICAL FIELD

This disclosure relates generally to aircraft design, and more particularly, though not exclusively, to a design for a tiltrotor aircraft.

BACKGROUND

Conventional tiltrotor aircraft are designed with a single monoplane wing for generating lift and supporting the rotors. Accordingly, the monoplane wing requires a surface area that is large enough to produce the requisite amount of lift in airplane mode, along with a stiffness that is capable of adequately supporting the rotors. As a result, the monoplane wing of conventional tiltrotor aircraft can be relatively large in size and also heavy.

Moreover, when a conventional tiltrotor aircraft is in helicopter mode, the downwash from the rotors impinges directly on the top surface of the monoplane wing, which produces a downward force or "download" that reduces the net lift from the rotors. Due to the large surface area of the monoplane wing of conventional tiltrotor aircraft, the download produced by the rotor downwash can significantly reduce rotor efficiency.

SUMMARY

According to one aspect of the present disclosure, a tiltrotor aircraft may comprise a fuselage; a biplane wing coupled to the fuselage, wherein the biplane wing comprises an upper wing structure and a lower wing structure; a plurality of tiltrotors coupled to the biplane wing; and at least one engine to power the plurality of tiltrotors.

DETAILED DESCRIPTION

Figure 1:
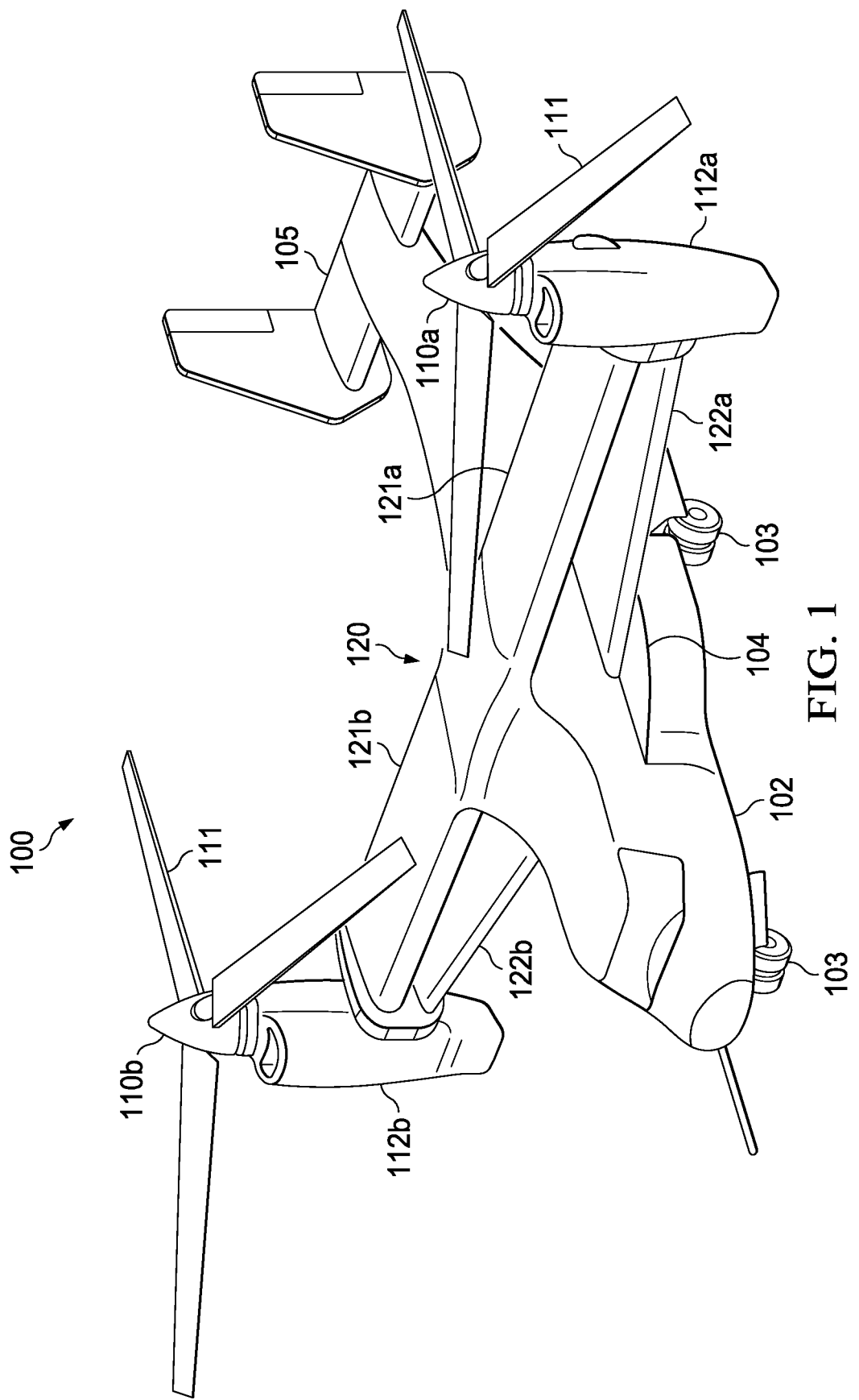
FIG. 1 illustrates an example embodiment of a biplane tiltrotor aircraft in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a biplane tiltrotor aircraft 100 in accordance with certain embodiments. In the illustrated embodiment, tiltrotor aircraft 100 includes a fuselage 102, an empennage 105, tiltrotors 110a and 110b, and a biplane wing 120, as described further below.

The fuselage 102 is the main body of tiltrotor aircraft 100, which may include a cabin (e.g., for crew, passengers, and/or cargo) and/or housing for certain mechanical and electrical components (e.g., engine(s), transmission, and/or flight controls). Empennage 105 is the tail assembly of aircraft 100 and includes horizontal and vertical stabilizers designed to improve control and/or stability of the aircraft.

Tiltrotors 110a and 110b provide flight capabilities for tiltrotor aircraft 100 and are respectively housed by nacelles 112a and 112b, which are coupled to the outboard ends of biplane wing 120. Each tiltrotor 110a and 110b includes a plurality of rotor blades 111 mounted to its respective nacelle 112a or 112b, along with various other components housed inside the nacelle 112a or 112b, such as an engine and/or gearbox (not shown). The engine(s) and gearbox(es) can be used to drive torque to tiltrotors 110a,b to cause their rotor blades 111 to rotate, which in turn generates lift. Moreover, the pitch of each rotor blade 111 can be adjusted in order to selectively control direction, thrust, and/or lift for tiltrotor aircraft 100. Finally, nacelles 112a,b may be capable of rotating in order to enable tiltrotor aircraft 100 to alternate between a helicopter mode, in which tiltrotors 110a,b are approximately vertical, and an airplane mode, in which tiltrotors 110a,b are approximately horizontal.

Tiltrotor aircraft 100 also includes a biplane wing 120, which is used to generate lift in airplane mode and also serves as a mount for tiltrotors 110a,b. Biplane wing 120 includes two wing structures 121 and 122, which are arranged vertically or stacked on top of each other. In particular, biplane wing 120 includes an upper wing structure 121 and a lower wing structure 122. Upper wing structure 121 includes a left plane 121a (port) and a right plane 121b (starboard), and lower wing structure 122 similarly includes a left plane 122a (port) and a right plane 122b (starboard).

Tiltrotor aircraft 100 provides various advantages over conventional tiltrotor aircraft designs. For example, conventional tiltrotor aircraft are implemented using a monoplane wing rather than a biplane wing 120. The monoplane wing of conventional tiltrotor aircraft requires a surface area that is large enough to produce the requisite amount of lift in airplane mode, along with a stiffness that is capable of supporting the tiltrotors. As a result, the monoplane wing of conventional tiltrotor aircraft is relatively large in size and also heavy. Moreover, when a conventional tiltrotor aircraft is in helicopter mode, the downwash from the tiltrotors impinges directly on the top surface of the monoplane wing, which causes a downward force or "download" that reduces the net lift from the tiltrotors. In some cases, for example, the rotor downwash on the wing may produce a download of over 10% of the thrust from the rotors, which significantly reduces rotor efficiency and the maximum payload supported by the aircraft.

Accordingly, tiltrotor aircraft 100 is implemented with a biplane wing 120, which is designed to alleviate the drawbacks of conventional tiltrotor aircraft that have a monoplane wing. For example, the lift produced by biplane wing 120 is split between its upper wing 121 and lower wing 122. Accordingly, biplane wing 120 can produce the requisite amount of lift for airplane mode using upper and lower wings 121 and 122 that are individually much smaller than a monoplane wing. In some embodiments, for example, upper wing 121 and lower wing 122 can each be roughly 50% smaller in surface area than a conventional monoplane wing of a tiltrotor aircraft, while producing a similar amount of lift. In this manner, the reduced surface area requirements enable the chord of upper wing 121 to be reduced (e.g., by roughly 50%), which in turn results in a reduction in magnitude of the download caused by the rotor downwash on upper wing 121 in helicopter mode. Moreover, reducing the download from the rotor downwash increases the resulting thrust and lift produced by tiltrotors 110a,b in helicopter mode, thus improving rotor efficiency, which can be leveraged to support a larger payload, longer missions, reduced fuel consumption, and so forth.

Moreover, biplane wing 120 also provides additional structural support for various components of tiltrotor aircraft 100, thus improving its structural integrity. For example, the outboard ends of biplane wing 120 are respectively used to mount tiltrotors 110a and 110b, which are coupled to and supported by both the upper and lower wing structures 121 and 122 of biplane wing 120, thus providing additional structural support for tiltrotors 110a,b. In particular, the additional support provided by lower wing 122 increases the structural support and stiffness of the nacelles 112a,b that house tiltrotors 110a,b, along with the pylons that couple the nacelles 112a,b to biplane wing 120. Moreover, the additional structural support that lower wing 122 provides for nacelles 112a,b can minimize or prevent propeller whirl flutter in airplane mode. Accordingly, the additional structural support provided by lower wing 122 enables biplane wing 120 to be designed with less stiffness than a monoplane wing, thus reducing the overall weight of biplane wing 120. Further, in some embodiments, lower wing structure 122 may be used as a mount and/or additional structural support for a sponson 104 that houses landing gear 103. For example, in some embodiments, landing gear sponsons 104 may be mounted underneath lower wing structure 122 on each side of the aircraft, and/or may be mounted on each side of the fuselage 102 and further coupled to lower wing structure 122 to provide additional structural support. In particular, each landing gear sponson 104 may include a housing having an upper surface directly coupled to a lower surface of the lower wing structure 122.

Accordingly, compared to a conventional tiltrotor aircraft with a monoplane wing, biplane wing 120 improves rotor efficiency by increasing thrust and lift in helicopter mode (e.g., by reducing the download from the rotor downwash in helicopter mode), improves the overall structural integrity of aircraft 100 by providing additional structural support, and reduces the overall weight of aircraft 100 using a lighter wing design (e.g., due to the reduced stiffness requirements of biplane wing 120).

The design of biplane tiltrotor aircraft 100 of FIG. 1 is merely illustrative of a wide variety of possible aircraft designs that can be implemented based on the teachings of this disclosure. In other embodiments, for example, biplane tiltrotor aircraft 100 may be implemented with different designs, configurations, arrangements, sizes and dimensions, types and/or numbers of components, and so forth (e.g., as shown in FIGS. 2-5). For example, biplane wing 120 may be implemented with varying configurations of upper wing 121 and lower wing 122, including any combination of dihedral, anhedral, horizontal, and/or parallel wing orientations. As another example, upper wing 121 and lower wing 122 of biplane wing 120 may be swept, staggered, implemented with different sizes or dimensions (e.g., different chord lengths and/or wingspans), implemented with wing flaps and/or flow fences, and so forth. In some embodiments, for example, lower wing 122 may be a typical wing designed similarly to upper wing 121, while in other embodiments lower wing 122 may be an aerodynamic airfoil-shaped strut for supporting upper wing 121 and nacelles 112a,b, while also being capable of generating lift due to its aerodynamic design. Moreover, tiltrotor aircraft 100 may be implemented with different numbers of components (e.g., wings, rotors, nacelles), additional types of components not shown in FIG. 1, and/or certain components omitted from FIG. 1. In some embodiments, for example, tiltrotor aircraft 100 may be implemented with a forward canard, more than one multiplane wing (e.g., a quad tiltrotor with two biplane wings), and/or multiplane wing(s) with more than two planes (e.g., triplane wing, quadruplane wing), among other examples.

Additional embodiments, implementations, and variations are described below with reference to the remaining FIGURES. It should be appreciated that aircraft 100 of FIG. 1 may be implemented using any aspects of the embodiments illustrated and/or described in connection with the remaining FIGURES.

FIGS. 2A-D illustrate example biplane wing configurations for a tiltrotor aircraft 200. In some embodiments, for example, the various biplane wing configurations of FIGS. 2A-D could be used in the implementation of biplane tiltrotor aircraft 100 of FIG. 1. In FIGS. 2A-D, a simplified example of a tiltrotor aircraft 200 is shown with varying biplane wing configurations. The example tiltrotor aircraft 200 of each figure includes a fuselage 202, landing gear 203a-c, tiltrotors 210a,b, nacelles 212a,b, and biplane wing 220. In some embodiments, for example, these components may be similar to the corresponding components illustrated and described in connection with biplane tiltrotor aircraft 100 of FIG. 1.

Figure 2A:
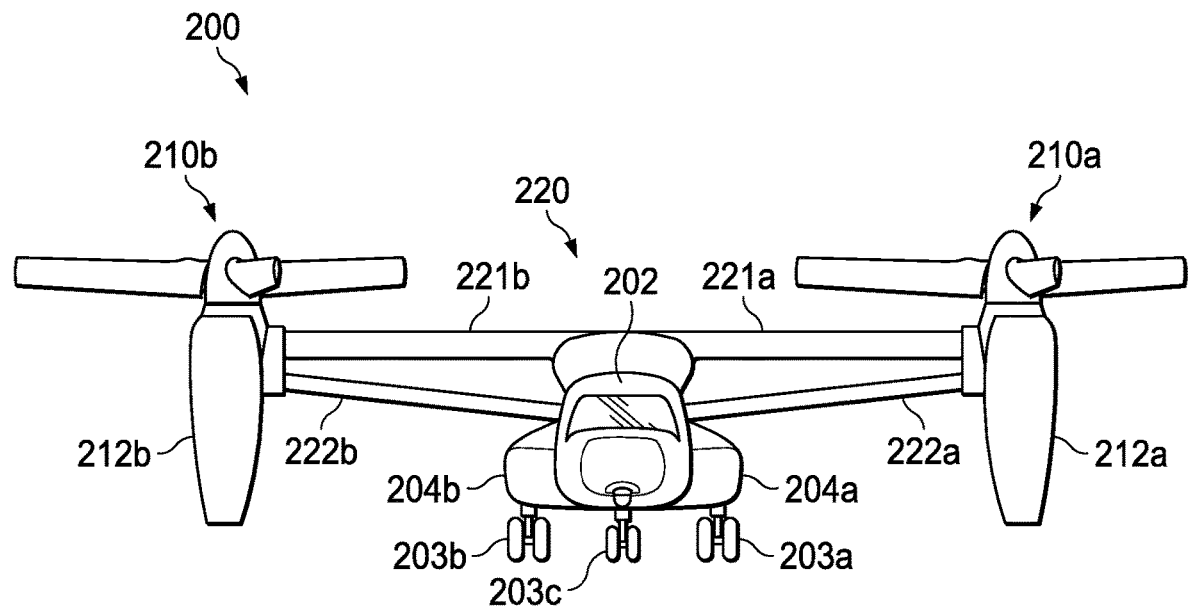
FIGS. 2A-D illustrate example biplane wing configurations for a tiltrotor aircraft.

In FIG. 2A, biplane wing 220 of tiltrotor aircraft 200 is implemented with a horizontal upper wing 221 and a dihedral lower wing 222. Upper wing 221 and lower wing 222 are respectively formed using multiple wing planes 221a,b and 222a,b that extend on the left and right sides of tiltrotor aircraft 200. Moreover, upper wing 221 extends from an upper portion of fuselage 202 with a roughly horizontal or straight orientation, while lower wing 222 extends from a lower portion of fuselage 202 with a dihedral or upwards angle. In this manner, upper wing 221 and lower wing 222 are spaced sufficiently apart to avoid airflow interference that may degrade performance, yet they are also coupled to nacelles 212a,b relatively close together in order to provide better structural support for nacelles 212a,b and the associated tiltrotors 210a,b. Moreover, lower wing 222 is further coupled to sponsons 204a,b that house landing gear 203a,b on the left and right sides of the fuselage 202, thus providing additional structural support for those landing gear sponsons 204a,b.

Figure 2B:
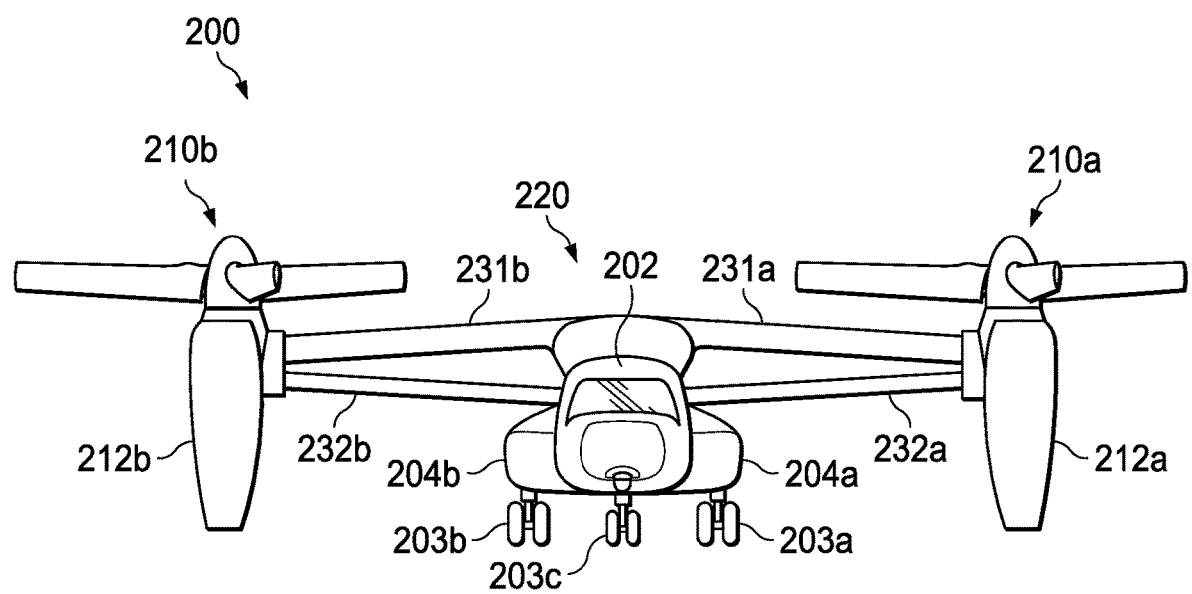

In FIG. 2B, biplane wing 220 of tiltrotor aircraft 200 is implemented with a anhedral upper wing 231 and a dihedral lower wing 232. Upper wing 231 and lower wing 232 are respectively formed using multiple wing planes 231a,b and 232a,b that extend on the left and right sides of tiltrotor aircraft 200. Moreover, upper wing 231 extends from an upper portion of fuselage 202 with an anhedral or downwards angle, while lower wing 232 extends from a lower portion of fuselage 202 with a dihedral or upwards angle. In this manner, upper wing 231 and lower wing 232 are spaced sufficiently apart to avoid airflow interference that may degrade performance, yet they are also coupled to nacelles 212a,b relatively close together in order to provide better structural support for nacelles 212a,b and the associated tiltrotors 210a,b. Moreover, lower wing 232 is further coupled to sponsons 204a,b that house landing gear 203a,b on the left and right sides of the fuselage 202, thus providing additional structural support for those landing gear sponsons 204a,b.

Figure 2C:
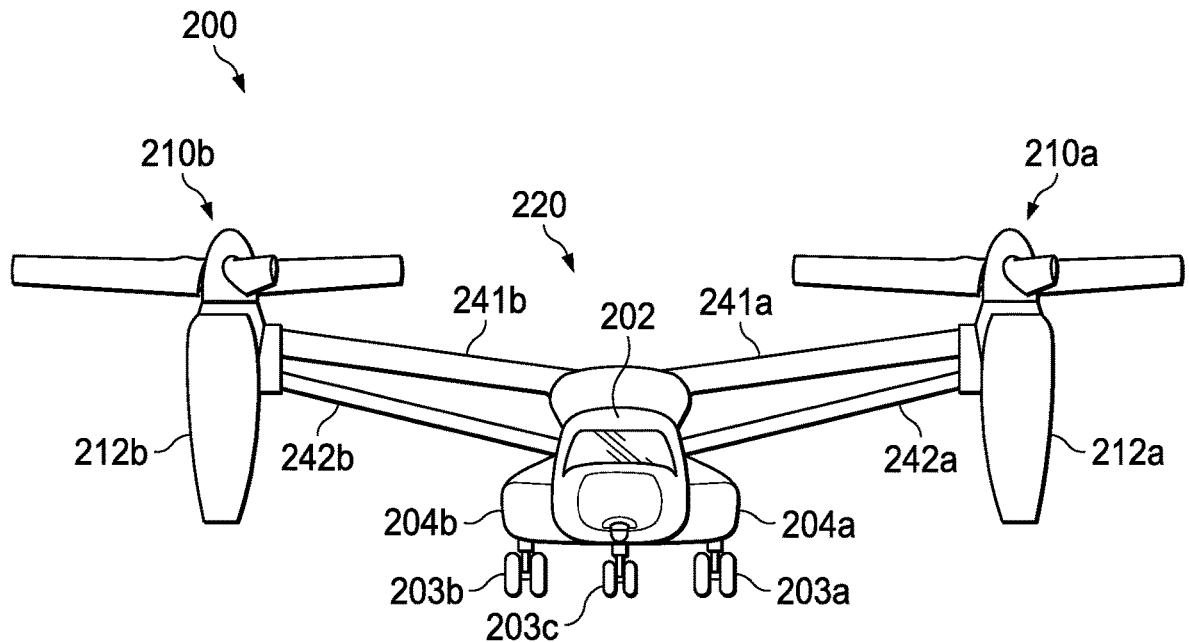

In FIG. 2C, biplane wing 220 of tiltrotor aircraft 200 is implemented with a dihedral upper wing 241 and a dihedral lower wing 242. Upper wing 241 and lower wing 242 are respectively formed using multiple wing planes 241a,b and 242a,b that extend on the left and right sides of tiltrotor aircraft 200. Upper wing 241 extends from an upper portion of fuselage 202, while lower wing 242 extends from a lower portion of fuselage 202. Moreover, upper wing 241 and lower wing 242 both extend at dihedral or upwards angles, although the dihedral angle of lower wing 242 is steeper than that of upper wing 241. In this manner, upper wing 241 and lower wing 242 are spaced sufficiently apart to avoid airflow interference that may degrade performance, yet they are also coupled to nacelles 212a,b relatively close together in order to provide better structural support for nacelles 212a,b and the associated tiltrotors 210a,b. Moreover, lower wing 242 is further coupled to sponsons 204a,b that house landing gear 203a,b on the left and right sides of the fuselage 202, thus providing additional structural support for those landing gear sponsons 204a,b.

Figure 2D:
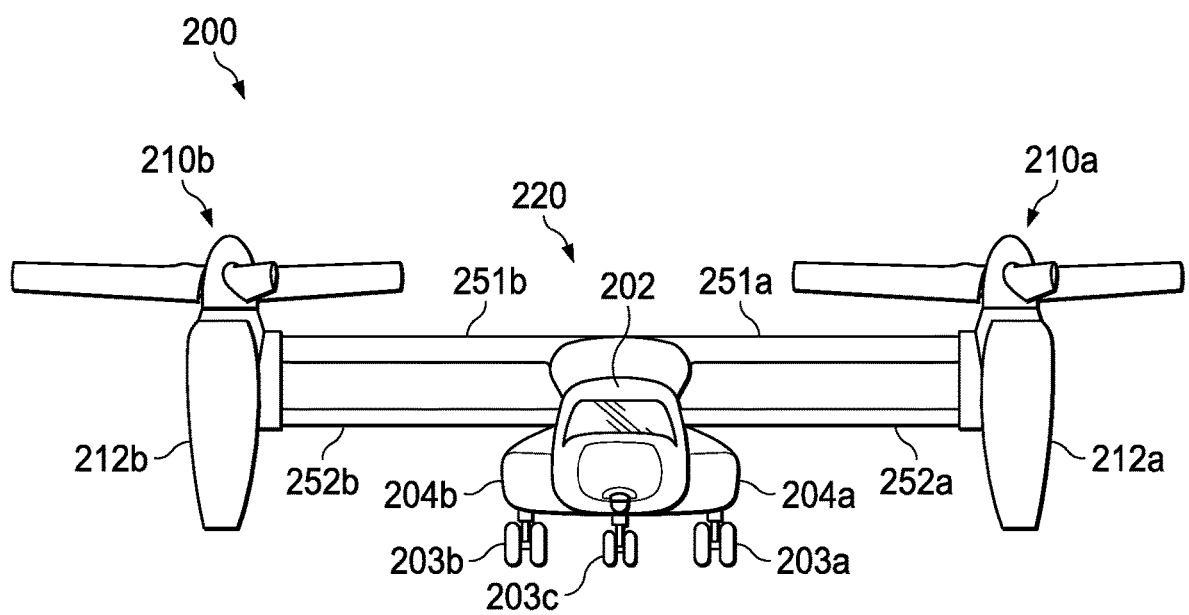

In FIG. 2D, biplane wing 220 of tiltrotor aircraft 200 is implemented an upper wing 251 and lower wing 252 that are approximately parallel. Upper wing 251 and lower wing 252 are respectively formed using multiple wing planes 251a,b and 252a,b that extend on the left and right sides of tiltrotor aircraft 200. Upper wing 251 extends from an upper portion of fuselage 202, while lower wing 252 extends from a lower portion of fuselage 202. Moreover, upper wing 251 and lower wing 252 are approximately parallel to each other with approximately horizontal or straight orientations. In this manner, upper wing 251 and lower wing 252 are spaced sufficiently apart to avoid airflow interference that may degrade performance. Further, both upper wing 251 and lower wing 252 are coupled to nacelles 212a,b, thus providing better structural support for nacelles 212a,b and the associated tiltrotors 210a,b. Moreover, lower wing 252 is further coupled to sponsons 204a,b that house landing gear 203a,b on the left and right sides of the fuselage 202, thus providing additional structural support for those landing gear sponsons 204a,b.

Figure 3A:
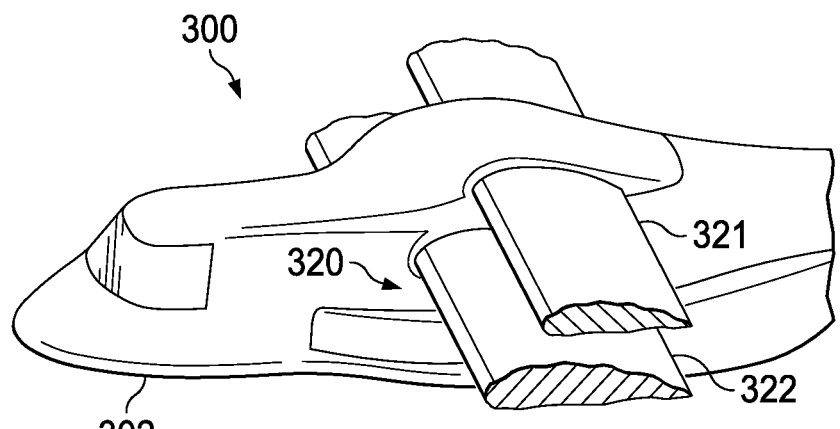
FIGS. 3A-C illustrate example wing designs for a biplane tiltrotor aircraft.
Figure 3B:
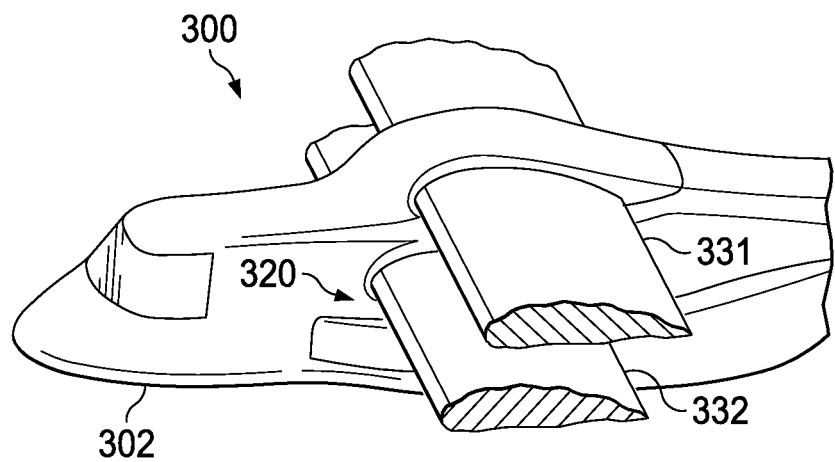
Figure 3C:
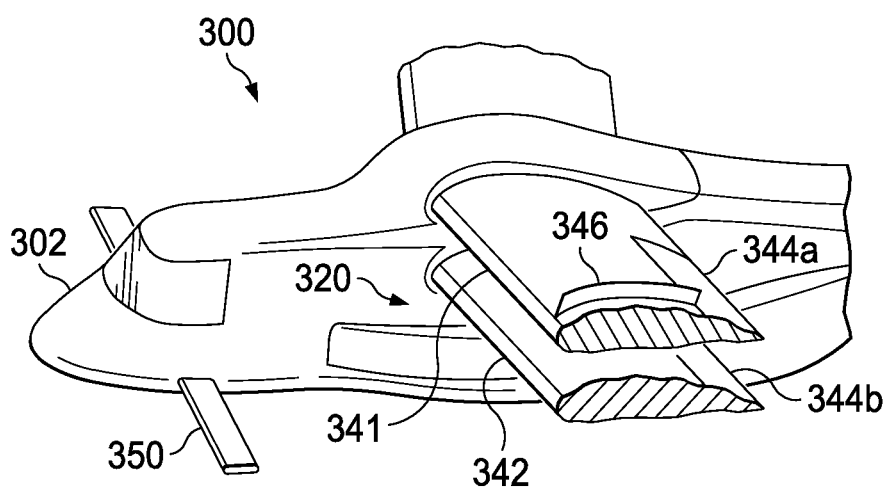

FIGS. 3A-C illustrate example wing designs for a biplane tiltrotor aircraft 300. In some embodiments, for example, the various wing designs of FIGS. 3A-C could be used in the implementation of biplane tiltrotor aircraft 100 of FIG. 1. In FIGS. 3A-C, a simplified view of a biplane tiltrotor aircraft 300 is shown with varying wing designs. For simplicity, the example tiltrotor aircraft 300 of each figure is only shown with a fuselage 302 and a biplane wing 320 on one side of the aircraft.

In FIG. 3A, biplane wing 320 of tiltrotor aircraft 300 is implemented with an upper wing 321 that has a shorter chord than the lower wing 322. In other embodiments, however, biplane wing 320 may be implemented with an upper wing 321 that has a longer chord than the lower wing 322.

In FIG. 3B, biplane wing 320 of tiltrotor aircraft 300 is implemented with staggered upper and lower wings 331 and 332. For example, in the illustrated embodiment, upper wing 331 is positioned slightly aft of lower wing 332 on fuselage 302. In other embodiments, however, upper wing 331 may be positioned slightly forward of lower wing 332 on fuselage 302.

In FIG. 3C, biplane wing 320 of tiltrotor aircraft 300 is implemented with swept upper and lower wings 341 and 342, wing flaps 344a,b, and a flow fence 346. For example, upper wing 341 and lower wing 342 are swept, meaning they are angled slightly backwards. Moreover, upper wing 341 and lower wing 342 respectively include wing flaps 344a and 344b, and upper wing 341 also includes a flow fence 346. In some embodiments, for example, upper and/or lower wings 341 and 342 may be implemented with wing flaps 344 and/or flow fences 346 to reduce the fountain effect and downwash associated with airflow from the tiltrotors. Moreover, tiltrotor aircraft 300 further includes a forward canard 350 positioned on the fuselage 302 forward of biplane wing 320, which may be used to produce additional lift and/or improve the control and stability of aircraft 300. In some embodiments, for example, forward canard 350 may be used to produce additional lift in airplane mode, but may be positioned far enough forward on the aircraft to avoid the downwash of the rotors in helicopter mode. In this manner, the additional lift produced by forward canard 350 may reduce the lift requirements of biplane wing 320, thus enabling a further reduction in size of the upper wing 341 of biplane wing 320, and thus further reducing the download caused by the rotor downwash on upper wing 341 in helicopter mode.

Figure 4:
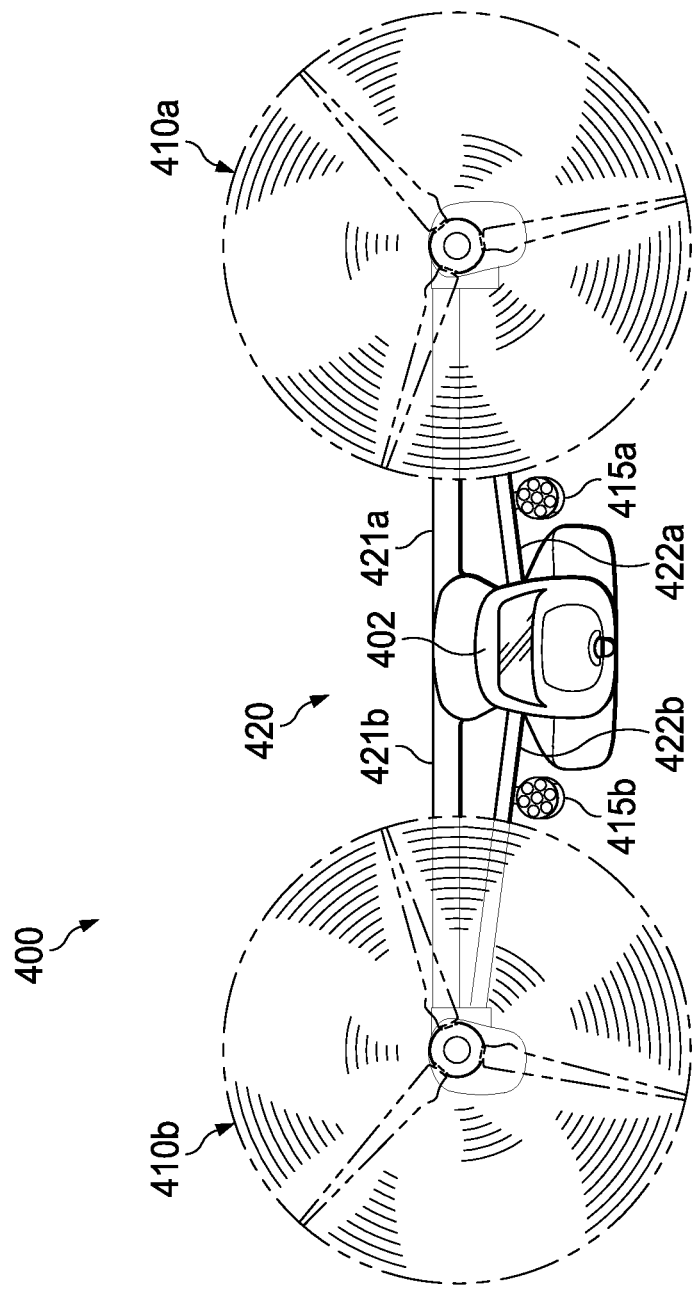
FIG. 4 illustrates an example embodiment of a biplane tiltrotor aircraft with a weapon ordnance.

FIG. 4 illustrates an example embodiment of a biplane tiltrotor aircraft 400 with a weapon ordnance. In the illustrated embodiment, tiltrotor aircraft 400 is shown with a fuselage 402, tiltrotors 410a,b, biplane wing 420, and weapon ordnance 415a,b. Moreover, tiltrotor aircraft 400 is configured in airplane mode with tiltrotors 410a,b tilted forward. Biplane wing 420 includes upper and lower wings 421 and 422, which are respectively formed using multiple wing planes 421a,b and 422a,b that extend on the left and right sides of tiltrotor aircraft 400. Moreover, weapon ordnance 415a,b is mounted on the bottom of lower wing 422 on both its left and right planes 422a,b. In this manner, weapon ordnance 415a,b is mounted in a location that is unobstructed by the blades of tiltrotors 410a,b when tiltrotor aircraft 400 is in airplane mode, as shown by the illustrated embodiment.

Moreover, in other embodiments, lower wing 422 may additionally or alternatively be used to mount or house other components or objects, such as surveillance equipment, communications equipment, fuel tanks, mechanical components, and so forth.

Figure 5:
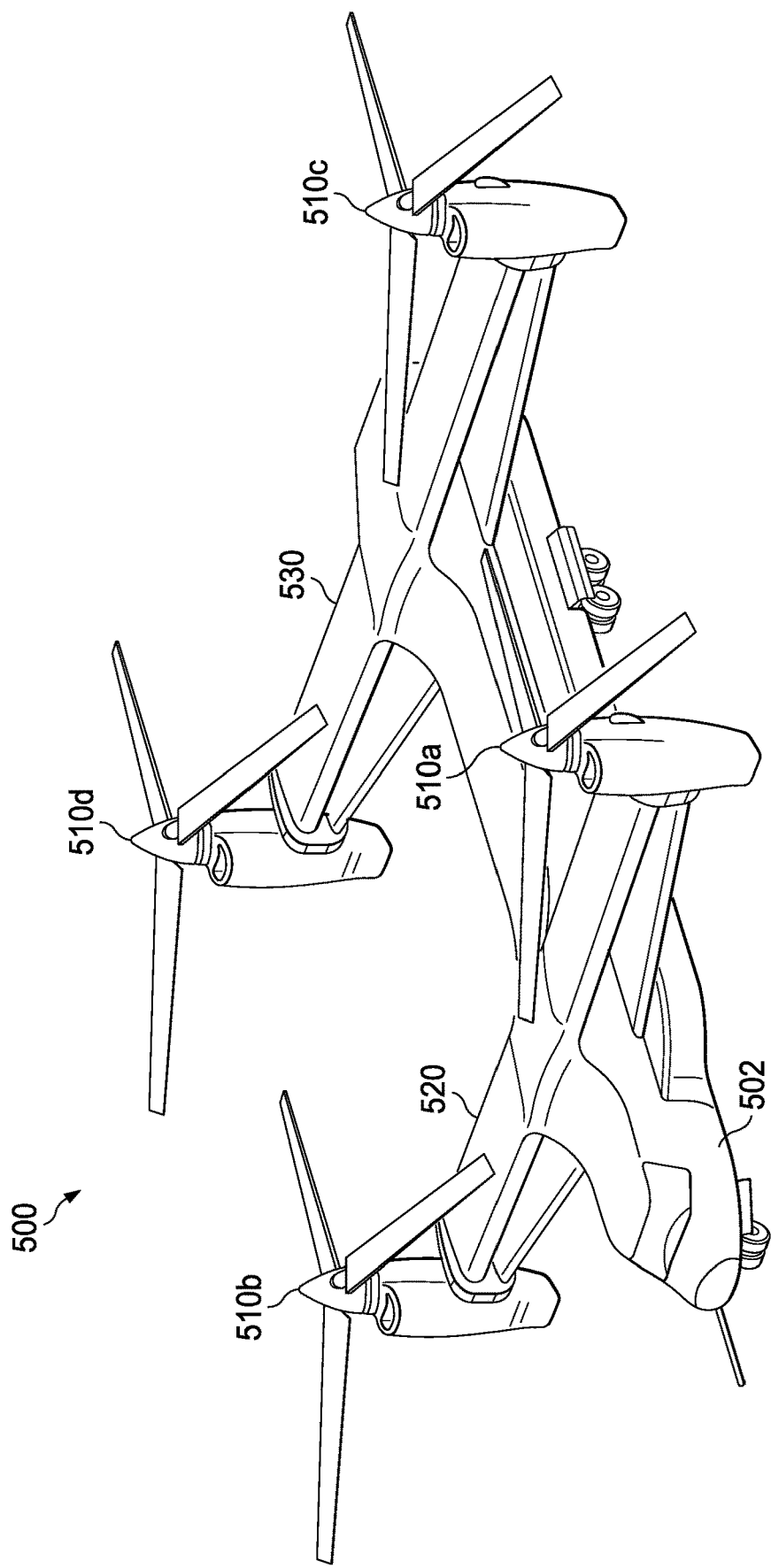
FIG. 5 illustrates an example embodiment of a quad tiltrotor with multiple biplane wings.

FIG. 5 illustrates an example embodiment of a quad tiltrotor 500 with multiple biplane wings. In some embodiments, for example, biplane tiltrotor aircraft 100 of FIG. 1 could be modified to include more than one biplane wing and additional tiltrotors for the additional wing(s). For example, in the illustrated embodiment, quad tiltrotor 500 of FIG. 5 is similar to biplane tiltrotor aircraft 100 of FIG. 1, but quad tiltrotor 500 includes an additional biplane wing and an additional set of rotors, as described further below.

In the illustrated embodiment, for example, quad tiltrotor 500 includes a fuselage 502, two biplane wings 520 and 530, and four tiltrotors 510a-d. Biplane wing 520 is positioned on the forward portion of the fuselage 502, and biplane wing 530 is positioned on the aft portion of the fuselage 502. Moreover, each biplane wing 520 and 530 includes two tiltrotors 510a,b or 510c,d mounted on the outboard ends of the respective wing. For example, tiltrotors 510a and 510b are mounted on the outboard ends of forward biplane wing 520, and tiltrotors 510c and 510d are mounted on the outboard ends of aft biplane wing 530. In this manner, quad tiltrotor 500 includes a total of two biplane wings and four tiltrotors. Other embodiments may be implemented using any desired number of multiplane wings and rotors (e.g., a tiltrotor aircraft with three multiplane wings and six rotors).

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A tiltrotor aircraft, comprising: a fuselage; a biplane wing comprising an upper wing structure and a lower wing structure; a nacelle coupled to each outboard end of the biplane wing; a plurality of tiltrotors, each tiltrotor housed by one of the nacelles and comprising a plurality of rotor blades coupled to the nacelle; an engine housed in each of the nacelles to power each of the plurality of tiltrotors; a landing gear sponson coupled to the fuselage and comprising a housing having an upper surface directly coupled to a lower surface of the lower wing structure, and wherein in a retracted position, the landing gear is completely housed within the landing gear sponson, wherein the upper wing structure and lower wing structure are spaced apart at the nacelles.

2. The tiltrotor aircraft of claim 1, wherein the upper wing structure and the lower wing structure are parallel.

3. The tiltrotor aircraft of claim 1, wherein the upper wing structure is horizontal and the lower wing structure is dihedral.

4. The tiltrotor aircraft of claim 1, wherein the upper wing structure is anhedral and the lower wing structure is dihedral.

5. The tiltrotor aircraft of claim 1, wherein the upper wing structure and the lower wing structure are dihedral.

6. The tiltrotor aircraft of claim 1, wherein the upper wing structure and the lower wing structure extend outwards on a left side and a right side of the fuselage.

7. The tiltrotor aircraft of claim 1, wherein the upper wing structure comprises a smaller chord than the lower wing structure.

8. The tiltrotor aircraft of claim 1, wherein each tiltrotor of the plurality of tiltrotors is coupled to the upper wing structure and the lower wing structure.

9. The tiltrotor aircraft of claim 1, wherein each tiltrotor of the plurality of tiltrotors is coupled to an outboard end of the biplane wing.

10. The tiltrotor aircraft of claim 9, wherein the plurality of tiltrotors comprises a first tiltrotor and a second tiltrotor, wherein the first tiltrotor is coupled to a first outboard end of the biplane wing, and wherein the second tiltrotor is coupled to a second outboard end of the biplane wing.

11. The tiltrotor aircraft of claim 1, wherein the biplane wing further comprises one or more flow fences.

12. The tiltrotor aircraft of claim 1, wherein the biplane wing further comprises one or more wing flaps.

13. The tiltrotor aircraft of claim 1, further comprising a forward canard coupled to the fuselage.

14. The tiltrotor aircraft of claim 1, further comprising a weapon ordnance coupled to the lower wing structure.

15. The tiltrotor aircraft of claim 14, wherein the weapon ordnance is coupled to the lower wing structure in a location that is unobstructed by the plurality of tiltrotors in airplane mode.

16. A tiltrotor aircraft, comprising: a fuselage; a plurality of biplane wings coupled to the fuselage, wherein the plurality of biplane wings extends outwards on a left side and a right side of the fuselage, and wherein each biplane wing of the plurality of biplane wings comprises an upper wing structure and a lower wing structure; a nacelle coupled to each outboard end of each of the plurality of biplane wings; a plurality of tiltrotors coupled to the plurality of biplane wings; and at least one engine to power the plurality of tiltrotors, each tiltrotor housed by one of the nacelles and comprising a plurality of rotor blades coupled to the nacelle; an engine housed in each of the nacelles to power each of the plurality of tiltrotors; and a landing gear sponson coupled to the fuselage and comprising a housing having an upper surface directly coupled to a lower surface of the lower wing stricture and wherein in a retracted position, the landing gear is completely housed within the landing gear sponson, wherein the upper wing structures and the lower wing structures are spaced apart at the nacelles.

17. The tiltrotor aircraft of claim 16, wherein the plurality of biplane wings comprises a first biplane wing and a second biplane wing, wherein the first biplane wing is positioned forward of the second biplane wing.

18. The tiltrotor aircraft of claim 17, wherein the first biplane wing and the second biplane wing are each coupled to at least two tiltrotors of the plurality of tiltrotors.

\* \* \* \* \*